(12) United States Patent
Koudal et al.

(10) Patent No.: US 6,453,753 B1
(45) Date of Patent: Sep. 24, 2002

(54) VOLUME OR MASS FLOWMETER

(76) Inventors: Ole Koudal, Stockmattrasse 85, CH-5400 Baden (CH); Volker Kobbe, Baettwiler Strasse 19, CH-4108 Witterswil (CH); Michael Brunner, Neuensteiner Strasse 11, CH-4053 Basel (CH); Bernhard Banholzer, Hummelgasse 12, D-79588 Efringen-Kirchen (DE)

( * ) Notice: Subject to any disclaimer, the term of this patent is extended or adjusted under 35 U.S.C. 154(b) by 0 days.

(21) Appl. No.: 09/497,791

(22) Filed: Feb. 3, 2000

(30) Foreign Application Priority Data

Feb. 5, 1999 (EP) ............................................. 99102267

(51) Int. Cl.$^7$ ............................... G01F 1/86; G01F 1/00
(52) U.S. Cl. ....................................... 73/861.02; 73/861
(58) Field of Search ........................ 73/861.07, 861.356, 73/862; 324/306

(56) References Cited

U.S. PATENT DOCUMENTS

| | | | |
|---|---|---|---|
| 3,945,253 A | 3/1976 | Liu et al. | |
| 4,669,301 A | 6/1987 | Kratt et al. | |
| 5,736,653 A | * | 4/1998 | Drahm et al. ........... 73/861.356 |
| 6,073,495 A | * | 6/2000 | Stadler ................. 73/861.356 |

FOREIGN PATENT DOCUMENTS

| | | |
|---|---|---|
| JP | 62-187221 | 8/1987 |
| JP | 7-26726 | 5/1995 |
| JP | 11-83563 | 3/1999 |

* cited by examiner

*Primary Examiner*—Benjamin R. Fuller
*Assistant Examiner*—Andre Allen
(74) *Attorney, Agent, or Firm*—Bose McKinney & Evans LLP

(57) ABSTRACT

A flow meter includes a flow sensor for conducting fluid in a measuring direction and an opposite measuring direction, alternatively. Evaluation electronics coupled to the flow sensor generate a sensor signal corresponding to the flow rate of the fluid. A first subcircuit converts the sensor signal to a flow rate signal and a second subcircuit coupled to the first subcircuit generates an output signal representing the flow rate in the measuring direction. A third subcircuit fed by the flow rate signal delivers a control signal for controlling the generation of the output signal. The third subcircuit determines a flow when the fluid flows in the measuring direction and a counterflow when the fluid flows in the opposite direction, and calculates a balanced flow therefrom. Depending on the balanced flow, the third subcircuit controls the second subcircuit with the control signal to generate the output signal in a predetermined manner.

24 Claims, 2 Drawing Sheets

VOLUME OR MASS FLOWMETER

FIELD OF THE INVENTION

The invention relates to a volume or mass flowmeter with a flow sensor and with evaluation electronics.

BACKGROUND OF THE INVENTION

For the purpose of measuring the flow rate of a fluid flowing in a pipeline or the like there are several principles which are each based on a physical regularity. Irrespective of the electric conductivity of the fluid, its volume flow rate can be measured, for example, by vortex flowmeters based on the Kármán vortex street or by ultrasonic flowmeters or its mass flow rate can be measured, for example, by mass flowmeters which are based on the Coriolis principle, by thermal mass flowmeters or by mass flowmeters which are based on the determination of a pressure difference over an orifice plate. The volume flow rate of electrically conductive fluids can further be measured with electromagnetic flowmeters based on Faraday's law of induction.

The evaluation electronics convert a signal as generated according to one of the aforementioned principles into an output signal proportional to the volume or mass flow rate with high measuring accuracy. For example, this can be the DC current with 4 mA to 20 mA for a given measuring range which has long been used in industrial metrology. However, the invention does not deal with this kind of output signal.

Rather, the invention is aimed at the elimination of a disadvantage which can occur in an alternating output signal, which has also been standardized for a long time in industrial metrology and whose frequency is proportional to the flow rate in the given measuring range, whenever the fluid flowing in a measurement direction due to the mechanical arrangement of the flow sensor flows occasionally, and for a short time in particular, in the opposite direction of the measurement. Such a counterflow rate cannot be converted by the evaluation electronics into a respective counterfrequency because, as is well known, an alternating signal cannot have a negative frequency.

The output at which the standardized output signal aforementioned at last lies is usually designated in technical manuals and data sheets as pulse/frequency output.

The aforementioned counterflow rate occurs, for example, when the flow rate is to be measured in a pipeline in which the fluid is not moved continuously but instead in a pulsating manner, e.g. by metering pumps or, in the case of fluids placed under pressure, by valves which are triggered to be open or closed. Although metering pumps have a very high precision of up to 0.5%, return flows, which also includes counterflow rates, occurring during each metering step cannot be avoided as a result of their principle of design (e.g. reciprocating pump, bellow-type pump or diaphragm pump).

Efforts were made up until now to compensate counterflow rates by damping in the evaluation electronics. As a result, the flow rate measurement only reacts with delays to changes in the flow rate and in addition it is necessary that the time constant of the damping has to be adjusted to the flow rate, i.e. the time constant must be changed and must be changeable.

SUMMARY OF THE INVENTION

It is an object of the present invention to provide a different and more advantageous approach for the elimination of the aforementioned disadvantage.

In order to achieve this object, the invention therefore consists in a volume or mass flow meter with a flow sensor and with evaluation electronics, comprising:

a first subcircuit for the generation of a flow rate signal,
  which in the given measuring range is proportional to the flow rate of the fluid to be measured, a second subcircuit for generating an output signal,
  whose frequency in the given measuring range is proportional to the flow rate of the fluid flowing in a measuring direction determined by the constructional arrangement of the flow sensor, and a third subcircuit,
  which determines a counterflow rate in an opposite measurement direction during a scanning interval, saves the same and subtracts it from the next measured flow rate.

In accordance with a preferred development of the invention the evaluation electronics add up the saved counterflow rates separately and make them available for further processing and/or display.

In accordance with a preferred embodiment of the invention and/or its preferred development, the third subcircuit comprises:

a clock generator,
  which periodically generates clock pulses with a predetermined clock period, an averager stage controlled by the clock generator,
  whose input is supplied with the flow rate signal and whose ouptut supplies an average flow-rate value signal representative of an average taken over the clock period, a write-read memory, a first divider,
  of which a divisor input is fed with a clock period signal representative of the clock period and
  of which a dividend input is connected to an output of the write-read memory, a first summer,
  of which a first input is connected to an output of the averager stage and
  of which a second input is connected to an output of the first divider, a first multiplier,
  of which a first input is connected to an output of the first summer,
  of which a second input is supplied with a setting signal representative of a reciprocal mass or a reciprocal volume and
  of which an output supplies a frequency signal representative of a frequency, a triple comparator,
  of which an input is connected to output of the first multiplier and
  of which an output is connected to an input of the second subcircuit and supplies a signal which
    represents zero when the frequency signal represents values smaller than zero,
    is equal to the frequency signal when the same represents values between zero and an adjustable maximum value and
    represents the maximum value when the freqeuncy signal represents values larger than the maximum value, a second multiplier,
  of which a first input is connected to the output of the triple comparator and of which a second input is supplied with the clock period signal, a second divider,
of which a first input is connected to an output of the second multiplier and
of which a second input is supplied with the setting signal, a third multiplier,
of which a first input is connected to the output of the averager stage and
of which a second input is supplied with the clock period signal, a summer/subtracter of which
a subtrahend input is connected to the output of the second divider,
a first addend input is connected to an output of the third multiplier,
a second addend input is connected to the output of the write-read memory and
an output is connected to an input of the write-read memory which is enabled by the clock signal.

One advantage of the invention is that a counterflow rate occurring at a specific time will already be considered by balancing during the measurement of the next flow rate value, i.e. in real time. Accordingly, in accordance with the invention the balancing follows a change in the flow rate without any delay, so that it is also not necessary to change any time constants.

BRIEF DESCRIPTION OF THE DRAWINGS

The invention and further advantages are now explained in detail by reference of embodiments shown in the figures and the drawings. The same parts in different figures are provided with the same reference numerals. If required for clarity of the drawings, already previously mentioned reference numerals have been omitted in subsequent figures. Moreover, details that have already been described will not be explained any further in the following figures.

DETAILED DESCRIPTION OF PREFERRED EMBODIMENTS

Figure 1:
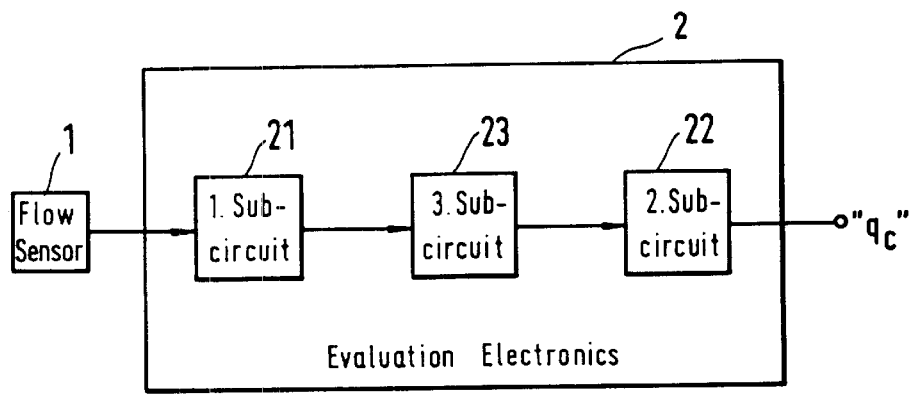
FIG. 1 shows a highly simplified block diagram for explaining the principle on which the invention is based.

The block diagram represented in FIG. 1 shows in a highly simplified and abstract manner the principal arrangement of a volume and mass flowmeter in accordance with the invention. If in the following it should be irrelevant as to whether a volume flowmeter or mass flowmeter is concerned, reference will only be made by using the term flowmeter. The preferred types of flowmeters in which the invention can be employed have already been stated above.

The main components of such a flowmeter are as usual a flow sensor 1 and evaluation electronics 2. The flow sensor 1 substantially comprises mechanical parts (not shown) which are required for the respective measuring principle and its operation. These are at least one measuring tube through which flows the fluid to be measured and, optionally, a housing.

At least one exciter arrangement which is specific to the measuring principle and/or at least one sensor arrangement are attached on or in the measuring tube, with the sensor arrangement being used as a physical-electric transducer and generating an output signal which is representative, particularly already directly, of the flow rate.

The evaluation electronics 2 process this output signal or the respective output signal of several sensor arrangements in such a way that the flow rate can be displayed on a display for example. In addition, the evaluation electronics 2 transform the flow rate for further electronic processing in at least one suitable other form of signal, in particular the form of signal of the aforementioned frequency output standard relevant to the invention.

In the case of electromagnetic flowmeters, the exciter arrangement specific to the measuring principle is an arrangement for producing a magnetic field which penetrates the measuring tube, such as a coil arrangement with an associated coil current generator, and the sensor arrangement specific to the measuring principle comprises at least two electrodes with which a voltage is tapped which is induced as a result of Faraday's law of induction on the flowing fluid which must be electrically conductive.

In the case of vortex flowmeters the exciter arrangement specific to the measuring principle is a bluff body placed against the fluid flowing in the measuring tube from which vortices separate and thus pressure fluctuations occur, and the sensor arrangement specific to the measuring principle comprises at least one sensor element which responds to said pressure fluctuations.

In the case of Coriolis mass flowmeters the exciter arrangement specific to the measuring principle acts on at least one measuring tube and excites vibrations of it, in particular resonant vibrations, and the sensor arrangement specific to the measuring principle comprises sensor elements which tap a phase shift between the measuring tube movements on the inlet and outlet sides.

In the case of ultrasonic flowmeters the exciter arrangement specific to the measuring principle and the sensor arrangement specific to the measuring principle are operatively interlinked in such a way that a first ultrasonic transducer which is coupled with the measuring tube and a second ultrasonic transducer which is coupled with the measuring tube and is arranged offset from the first ultrasonic transducer are operated periodically alternatingly in such a way that the one acts as transmitter and the other simultaneously as a receiver. Accordingly, the ultrasound is sent through the fluid alternatingly in the direction of flow and in the direction opposite of the flow, so that the flow velocity and thus the flow rate can be determined from the difference in the running time of the ultrasound.

In the case of thermal mass flowmeters the exciter arrangement specific to the measuring principle is a heating element arranged in the fluid and the sensor arrangement specific to the measuring principle comprises a temperature probe which detects a temperature difference between itself and the heating element. The temperature difference is dependent on the mass flow rate.

In the case of pressure difference mass flowmeters the exciter arrangement specific to the measuring principle is an orifice plate placed in the fluid and restricting the flow cross section, and the sensor arrangement specific to the measuring principle comprises a pressure pick-up in front of the orifice plate and a pressure pick-up behind the orifice plate each leading to a pressure-difference sensor element.

In FIG. 1 the evaluation electronics 2 comprise a first subcircuit 21 for generating a flow rate signal "q". In a given measuring range m the same is proportional with a high precision to the flow rate q of a fluid flowing in the flow sensor 1.

The evaluation electronics 2 further comprise a second subcircuit 22 which according to the aforementioned standard produces an output signal "$q_c$" whose frequency, in the given measuring range m, is proportional with a high precision to the flow rate $q_c$ which occurs in a measuring direction of the flowing fluid determined by the constructional arrangement of the flow sensor. The second subcircuit 22 can be a square-wave generator for example, whose frequency f is controlled by the flow rate $q_c$ and whose output signal is provided with a predetermined, but fixed, mark-to-space ratio.

Figure 2:
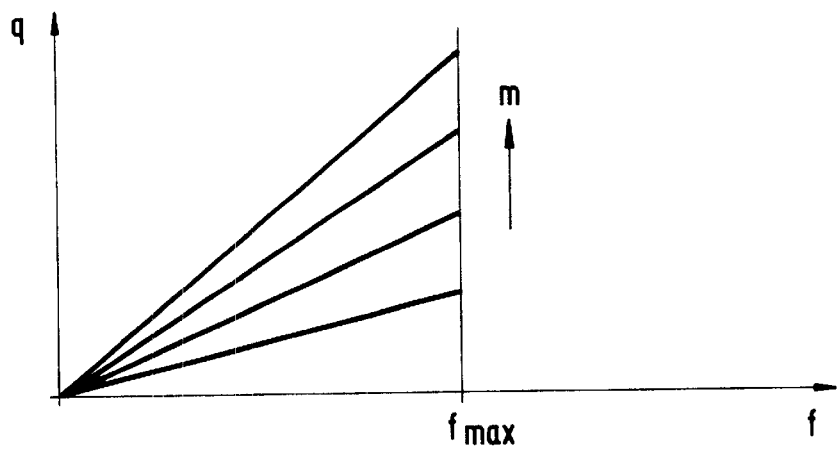
FIG. 2 shows a diagram for illustrating one of the properties of the second subcircuit which property is relevant for the invention.

These connections are shown schematically in FIG. 2. For the sake of simplicity it is assumed for FIG. 2 that the axes of coordinates each have a linear division, so that the dependence q–f is strictly linear, i.e. it results in a family of straight lines whose parameter is a measuring range m of the flow rate q which is assigned to a maximum value $f_{max}$ of the frequency f.

In FIG. 1, a third subcircuit 23 is disposed between the first and second subcircuit, which third subcircuit determines a counterflow rate –q' occurring in the opposite measurement direction during a scanning interval δt, stores the same and subtracts it from the next measured flow rate.

Figure 3:
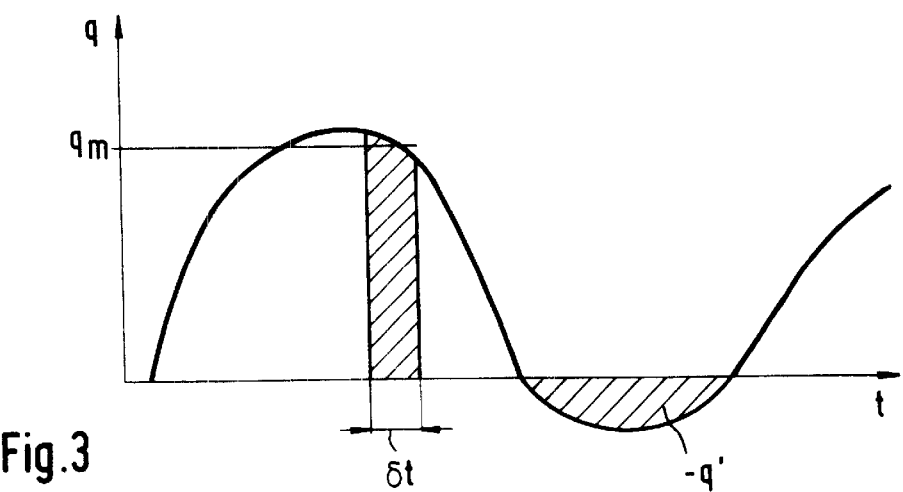
FIG. 3 shows a diagram for illustrating the problem of the invention.

FIG. 3 is used to explain the disadvantage due to the occurrence of this counterflow rate –q'. FIG. 3 is a diagram in which the flow rate q is entered as ordinate over the abscissa for the time t.

The curve of FIG. 3 extends not only above the abscissa, where the q values are positive, but also below the same, so that there are also negative q values –q'. These are caused by the reasons as illustrated above and falsify the result of the measurement and reduce its accuracy. Moreover, FIG. 3 shows a duration at during which the flow rate has an average value $q_m$.

Figure 4:
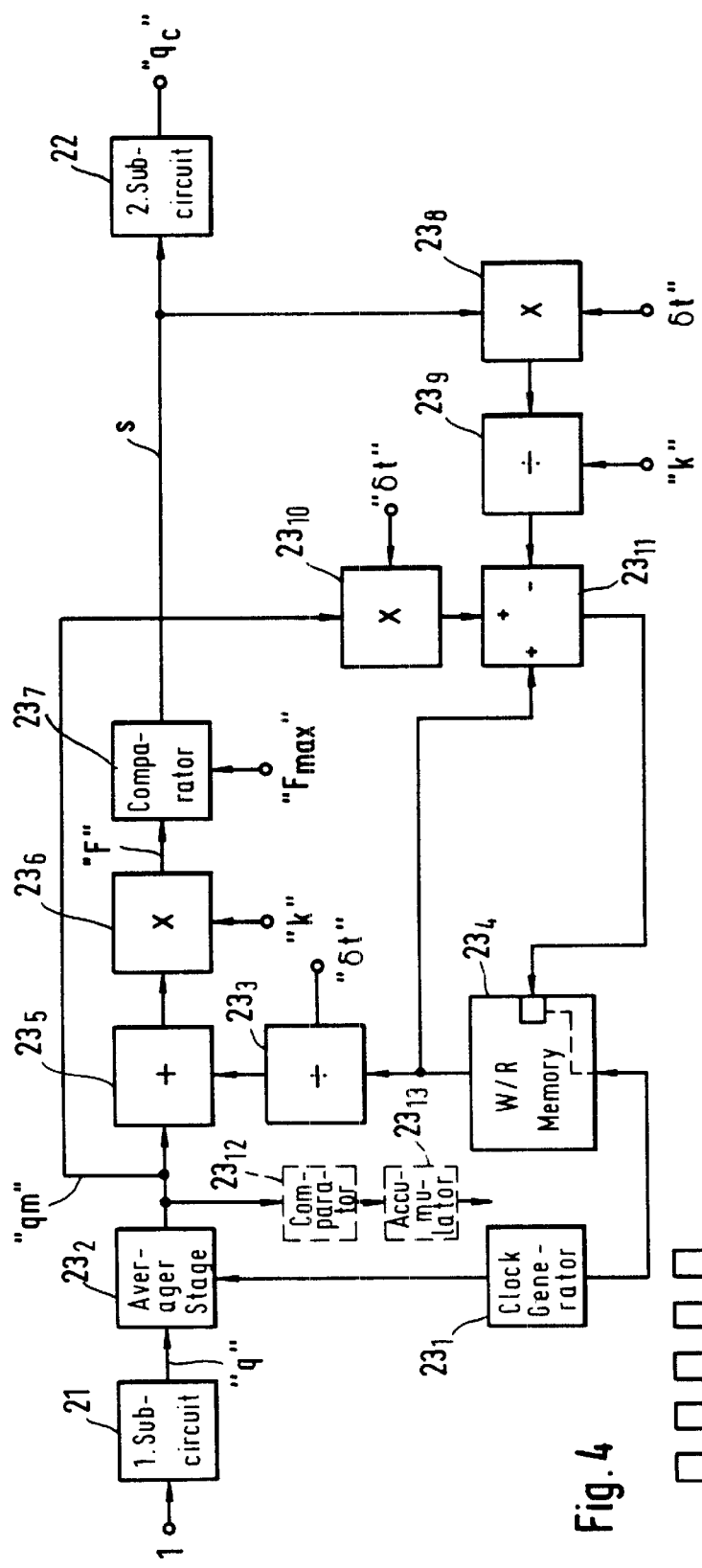
FIG. 4 shows, among other things, a block diagram of a preferred embodiment of the second subcircuit.

The block diagram of FIG. 4 shows the details of a preferred embodiment of evaluation electronics which substantially relate to the third subcircuit 23. A clock generator $23_1$ is used for producing periodic clock pulses which have a predeterminable or predeterminable clock period δt, i.e. are equal to the duration δt of FIG. 3.

The variation in time of the clock pulses is shown at the left below the clock generator $23_1$. In this case they are rectangular pulses with a unity mark-to-space ratio and with a suitable frequency.

An averager stage $23_2$ is controlled by the clock generator $23_1$. The input of the averager stage $23_2$ is supplied with the flow rate signal "q". Its output supplies at the end of each clock pulse an average flow-rate value signal "$q_m$" which is representative of the average $q_m$ taken over the clock period δt.

A divisor input of a first divider $23_3$ is supplied with a clock period signal "δt" which is representative of the clock period δt. A dividend input of the divider $23_3$ is connected to an output of a write-read memory $23_4$ which can be a common RAM or even an EEPROM for example.

A first input of a first summer $23_5$ is connected to an output of the averager stage $23_2$, a second input to an output of the first divider $23_3$ and an output to a first input of a first multiplier $23_6$. A second input of the latter is supplied with a setting signal "k" which is representative of a reciprocal mass or a reciprocal volume. The multiplier $23_6$ generates a frequency signal "F" representative of a frequency F at an output.

An input of a triple comparator $23_7$ is connected to the output of the multiplier $23_6$. One of its outputs is connected to an input of the second subcircuit 22 and supplies the same with a signal s as follows:

If the frequency signal "F" represents values lower than zero, the signal s represents zero.

If the frequency signal "F" represents values between zero and a maximum value $F_{max}$, signal s is equal to the frequency signal "F" per se.

If the frequency signal "F" represents values higher than the maximum value $F_{max}$, signal s represents the maximum value $F_{max}$.

Figure 5:
FIG. 5 shows a diagram for illustrating the properties of the output signal of the triple comparator of the second subcircuit.

This course of the signal s is shown in FIG. 5. Notice should be taken that the above statement that the frequency signal "F" can be smaller than zero is no contradiction to the statement made above that there are no negative frequencies. The last statement relates to the property of subcircuit 22 which assigns the variable frequency of an alternating current or voltage generator to the flow rate q. The frequency of alternating currents or voltages, however, can only be positive.

The situation is the opposite with the frequency signal "F". It represents a value which is the result of the multiplication of the average flow-rate value signal "$q_m$" representative of the average $q_m$ with the setting signal "k" representative of a reciprocal volume or a reciprocal mass. The aforementioned value thus represents a frequency. The frequency signal "F" can undoubtedly assume negative values, namely in cases when the aforementioned counterflow rates –q' occur.

In FIG. 4, a first input of a second multiplier $23_8$ is connected to the output of the triple comparator $23_7$, of which multiplier a second input receives the clock period signal "δt". It is followed by a second divider $23_9$ of which a first input is connected to an output of the multiplier $23_8$ and a second input is supplied with the setting signal "k". A first input of a third multiplier $23_{10}$ is connected to the output of the averager stage $23_2$ and a second input is supplied with the clock period signal "δt".

A subtrahend input of a summer/subtracter $23_{11}$ is connected to an output of the divider $23_9$, a first addend input to an output of the multiplier $23_{10}$ and a second addend input to the output of the write-read memory $23_4$. An output of the summer/subtracter $23_{11}$ is connected to an input of the write-read memory $23_4$ which is enabled by the clock signal.

The output signal of the summer/subtracter $23_{11}$ is always read into the write-read memory $23_4$ during falling edges of the clock pulses, see the arrows. As the average flow-rate value signal "qm" is always made available during the rising edges of the clock pulses, a value which is read into the write-read memory $23_4$ in a directly preceding clock period is applied to an input of the summer $23_5$ for half of a directly following clock pulse period until a new value is written into the write-read memory $23_4$.

Accordingly, a counterflow rate –q' is already deducted from the flow rate after a single clock pulse period. As opposed to the aforementioned damping there is an immediate balancing.

When switching on the flowmeter a suitable initial value such as preferably a zero value is written into the write-read memory $23_4$. Even during the current measurements it may be appropriate to write the zero value into, and to thus perform a reset of, the write-read memory $23_4$.

FIG. 4 shows in a broken line that the counterflow rates −q' can be added up and, optionally, displayed and further processed in other ways by means of a comparator $23_{12}$ with a following accumulator $23_{13}$. The comparator $23_{12}$ is set by the dimensioning of a switching threshold for example in such a way that (positive) values of its input signals are suppressed.

Notice is to be taken in respect to the reference numerals which are marked with quotation marks and do not consist of numbers that it is thereby expressed that they concern reference numerals for signals which represent the respective values bearing no quotation marks. The information content of these signals is therefore the respective value, but not the signal per se.

The functions of the individual stages of the block diagram of FIG. 4 can also be realized by means of a respectively programmed microprocessor which will be preferably applied when the evaluation electronics are already provided with a microprocessor for processing the flow rate signal.

What is claimed is:

1. A flowmeter for measuring a flow rate of a fluid flowing through said flowmeter in a preselected measuring direction, said flowmeter comprising:
   a flow sensor for conducting the fluid and for generating a sensor signal corresponding with the flow rate; and
   evaluation electronics coupled to the flow sensor, said evaluation electronics including
      a first subcircuit fed by the sensor signal, said first subcircuit converting said sensor signal to a flow rate signal representing the flow rate,
      a second subcircuit being operable to generate an output signal representing the flow rate of the fluid flowing in the measuring direction, and
      a third subcircuit fed by the flow rate signal and delivering a control signal fed to the second subcircuit for controlling the generation of the output signal;
      wherein the third subcircuit determines from said flow rate signal a flow when the fluid flows in the measuring direction and a counterflow when the fluid flows in an opposite measurement direction, respectively, and
      wherein the third subcircuit calculates from said determined counterflow and from said determined flow a balanced flow for developing the control signal.

2. The flowmeter as claimed in claim 1, wherein the output signal has a frequency corresponding to the flow rate and said frequency is controlled by the control signal.

3. The flowmeter as claimed in claim 1, wherein the third subcircuit includes a write-read memory for storing a current flow value and a current counterflow value, respectively.

4. The flowmeter as claimed in claim 1, wherein the evaluation electronics include a clock generator generating periodic clock pulses for controlling the third subcircuit.

5. The flowmeter as claimed in claim 1, wherein the flow sensor is a mass flow sensor.

6. The flowmeter as claimed in claim 1, wherein the flow sensor is a volume flow sensor.

7. The flow meter as claimed in claim 1, wherein the flow sensor is a mass flow sensor.

8. The flow meter as claimed in claim 1, wherein the flow sensor is a volume flow sensor.

9. Evaluation electronics coupled to a flow sensor delivering a sensor signal corresponding with a flow rate of a fluid to be measured, said fluid flowing through at least one measuring tube of the flow sensor having a preselected measuring direction, said evaluation electronics comprising:
   a first subcircuit fed by the sensor signal, said first subcircuit being operable to generate a flow rate signal representing the flow rate of the fluid;
   a second subcircuit being operable to generate an output signal having a frequency corresponding to the flow rate of the fluid flowing in the measuring direction of the flow sensor; and
   a third subcircuit fed by the flow rate signal and delivering a frequency control signal fed to the second subcircuit for controlling the frequency of the output signal;
   wherein the third subcircuit determines from said flow rate signal a flow when the fluid flows in the measuring direction and a counterflow when the fluid flows in an opposite measurement direction, respectively, and
   wherein the third subcircuit calculates from said determined counterflow and from said determined flow a balanced flow for developing the frequency control signal.

10. The evaluation electronics as claimed in claim 9, wherein the output signal has a frequency corresponding to the flow rate of the fluid flowing in the measuring direction and said frequency is controlled by the control signal.

11. The evaluation electronics as claimed in claim 9, wherein the third subcircuit includes a write-read memory for storing a current flow value and a current counterflow value, respectively.

12. The evaluation electronics as claimed in claim 11, wherein the third subcircuit calculates the balanced flow from the flow value and the counterflow value being currently stored in the write-read memory, respectively, and from the sensor signal.

13. The evaluation electronics as claimed in claim 9, wherein the evaluation electronics include a clock generator generating periodic clock pulses for controlling the third subcircuit.

14. the method as claimed in claim 13, wherein the step of detecting a change of the flow direction includes signalizing that currently the fluid is flowing through the measuring tube in a direction opposite to said measuring direction.

15. A method for measuring a flow rate of a fluid flowing through at least one measuring tube of a flow sensor having a preselected measuring direction, said method comprising the steps of:
   detecting the flow rate and a current flow direction of the fluid flowing through the flow sensor;
   generating at least one sensor signal to represent the detected flow rate and the detected flow direction;
   calculating from said at least one sensor signal a balanced flow of the fluid; and
   generating an output signal representing the flow rate in the measurement direction when said balanced flow is greater than a preselected threshold value.

16. The method as claimed in claim 15, wherein the step of calculating the balanced flow includes detecting from the at least one sensor signal a change in the flow direction.

17. The method as claimed in claim 15, wherein the step of generating the output signal includes adjusting a frequency of said output signal to a frequency value corresponding to the detected flow rate.

18. The method as claimed in claim 15, wherein the threshold value is zero.

19. The method as claimed in claim 15, wherein the step of calculating a balanced flow includes digitizing said sensor signal.

20. The method as claimed in claim 15, wherein the step of calculating the balanced flow includes calculating from the sensor signal an average flow rate value.

21. The method as claimed in claim 15, wherein the step of calculating the balanced flow includes calculating from said sensor signal a flow value currently representing a flow and a counterflow of the fluid, respectively.

22. The method as claimed in claim 21, wherein the step of calculating a balanced flow further includes storing the flow value.

23. The method as claimed in claim 22, wherein the step of calculating a balanced flow further includes adding a value currently derived from the flow rate signal to the currently stored flow value and to the currently stored counterflow value, respectively.

24. The method as claimed in claim 15, wherein:

the step of calculating the balanced flow includes calculating from the sensor signal an average flow rate value and further includes calculating from the sensor signal a flow value currently representing a flow and a counterflow of the fluid, respectively, and the step of calculating the flow value further includes multiplying the average flow rate value with a clock period.

* * * * *

UNITED STATES PATENT AND TRADEMARK OFFICE
CERTIFICATE OF CORRECTION

PATENT NO. : 6,453,753 B1 Page 1 of 1
DATED : September 24, 2002
INVENTOR(S) : Ole Koudal et al.

It is certified that error appears in the above-identified patent and that said Letters Patent is hereby corrected as shown below:

<u>Title page,</u>
Under Item [30]: please add the following priority application information,
-- Related U.S. Application Data:
    [60]    Provisional application No.
             60/122,848 filed Mar. 04, 1999 --

Signed and Sealed this

Eleventh Day of March, 2003

JAMES E. ROGAN
*Director of the United States Patent and Trademark Office*